US012664679B2

(12) United States Patent
Sohn et al.

(10) Patent No.: US 12,664,679 B2
(45) Date of Patent: Jun. 23, 2026

(54) SURFACE IMAGE GUIDANCE-BASED SYSTEM FOR ALIGNING AND MONITORING PATIENT POSITION

(71) Applicant: INJE UNIVERSITY INDUSTRY-ACADEMIC COOPERATION FOUNDATION, Gimhae-si (KR)

(72) Inventors: Moon Jun Sohn, Seoul (KR); Chi Woong Mun, Busan (KR); Haeng Hwa Lee, Seoul (KR)

(73) Assignee: INJE UNIVERSITY INDUSTRY-ACADEMIC COOPERATION FOUNDATION, Gimhae-si (KR)

( * ) Notice: Subject to any disclaimer, the term of this patent is extended or adjusted under 35 U.S.C. 154(b) by 391 days.

(21) Appl. No.: 18/274,074

(22) PCT Filed: Nov. 26, 2021

(86) PCT No.: PCT/KR2021/017598
§ 371 (c)(1),
(2) Date: Jul. 25, 2023

(87) PCT Pub. No.: WO2022/158697
PCT Pub. Date: Jul. 28, 2022

(65) Prior Publication Data
US 2024/0273755 A1 Aug. 15, 2024

(30) Foreign Application Priority Data
Jan. 25, 2021 (KR) ........................ 10-2021-0010303

(51) Int. Cl.
| *G06T 7/73* | (2017.01) |
| *G06T 7/00* | (2017.01) |
| *G06T 7/593* | (2017.01) |

(52) U.S. Cl.
CPC .............. *G06T 7/73* (2017.01); *G06T 7/0012* (2013.01); *G06T 7/593* (2017.01);
(Continued)

(58) Field of Classification Search
None
See application file for complete search history.

(56) References Cited

U.S. PATENT DOCUMENTS 11,468,577 B2 * 10/2022 Yi ........................... G06T 7/593
11,576,578 B2 * 2/2023 Hao ..................... A61B 5/7485
(Continued)

FOREIGN PATENT DOCUMENTS

KR 10-1337423 B1 12/2013
KR 20160022576 * 8/2014
(Continued)

OTHER PUBLICATIONS

Apparatus and Method for Matching 3D Coordinate Joint of Human Based on RGB Sensor and Depth Sensor, Lee sang hoon (Year: 2014).*
(Continued)

*Primary Examiner* — Nancy Bitar
(74) *Attorney, Agent, or Firm* — Sughrue Mion, PLLC

(57) ABSTRACT

Disclosed is a surface image guidance-based system for aligning and monitoring patient position including a first RGB depth optical camera positioned toward a table, on which a patient may lie, and configured to capture an image of a right side of the patient's body, a second RGB depth optical camera positioned toward the table, on which the patient may lie, and configured to capture an image of a left side of the patient's body, a central RGB depth optical camera positioned toward the table, on which the patient may lie, and configured to capture an image of a front side of the patient's body, and a central server configured to
(Continued)

collect three-dimensional data of the patient on the basis of information captured in conjunction with the three cameras.

6 Claims, 18 Drawing Sheets

(52) U.S. Cl.
CPC ............... *G06T 2207/10024* (2013.01); *G06T 2207/10028* (2013.01); *G06T 2207/10081* (2013.01)

(56) References Cited

U.S. PATENT DOCUMENTS

| | | | | |
|---|---|---|---|---|
| 11,576,645 B2 * | 2/2023 | Hao | ..................... | A61B 6/0407 |
| 2020/0268339 A1 * | 8/2020 | Hao | ....................... | A61B 6/544 |

FOREIGN PATENT DOCUMENTS

| | | |
|---|---|---|
| KR | 10-2014-0142037 A | 12/2014 |
| KR | 10-2016-0022576 A | 3/2016 |
| KR | 10-2017-0015928 A | 2/2017 |
| KR | 10-2020-0013984 A | 2/2020 |

OTHER PUBLICATIONS

International Search Report for PCT/KR2021/017598 dated May 11, 2022.
Written Opinion for PCT/KR2021/017598 dated May 11, 2022.

* cited by examiner

RESULT OF MATCHING THREE-DIMENSIONAL BODY SURFACE IMAGE OF PATIENT + CT IMAGE OF PATIENT
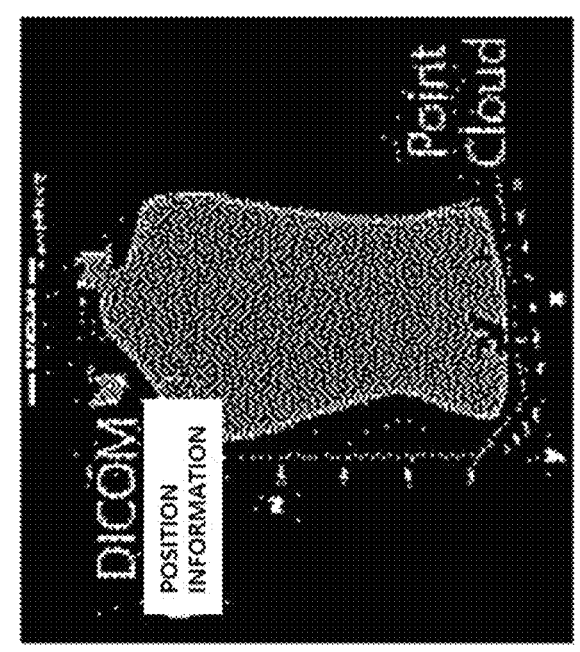
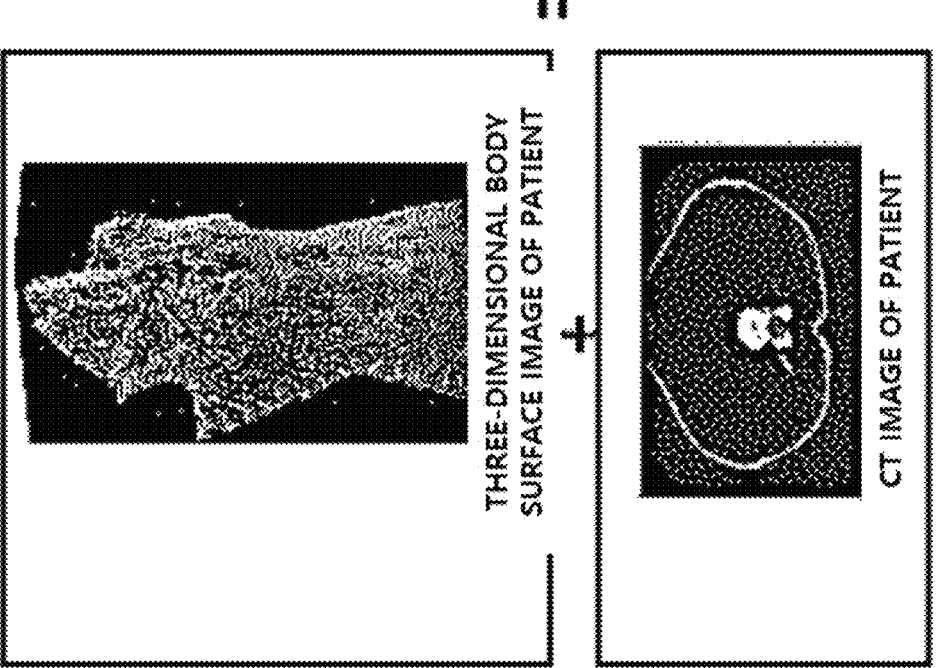
THREE-DIMENSIONAL BODY SURFACE IMAGE OF PATIENT
CT IMAGE OF PATIENT
FIG. 2

☑ THREE DEPTH CAMERAS + MARKER ON MEDICAL BED – HARDWARE

+

☑ PC-BASED PATIENT POSITION GUIDE SOFTWARE – SOFTWARE

Realtime PointCloud Generation Module

PointCloud Comparision Module

PointCloud Display Module

CT Scan Image Align Module

CT Scan Image Realtime Display Module

FIG. 5
R = 1.43m
CAMERA ARRANGEMENT
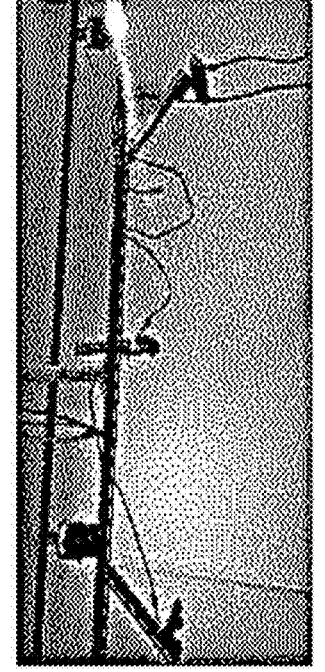
CAMERA ARRANGEMENT RESULT
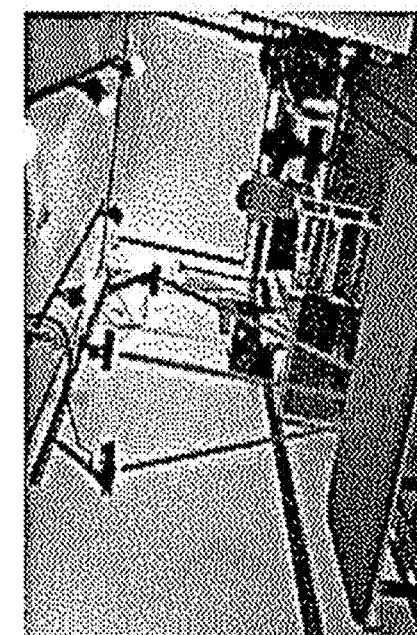
POINT CLOUD CONVERTS TL AND TR MATRICES MADE BY LEFT AND
RIGHT CAMERAS INTO TOP CAMERA

FIG. 8

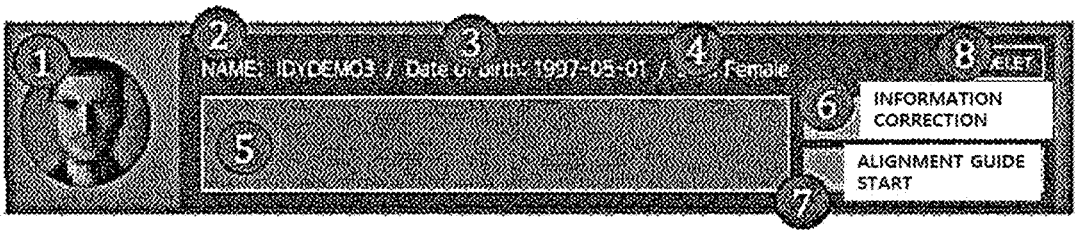

| NO. | ITEM | DEFINITION |
|---|---|---|
| 1 | PHOTOGRAPH | OUTPUT REGISTERED PHOTOGRAPH |
| 2 | NAME | OUTPUT REGISTERED NAME |
| 3 | DATE OF BIRTH | OUTPUT REGISTERED DATE OF BIRTH |
| 4 | GENDER | OUTPUT REGISTERED GENDER |
| 5 | PATIENT INFORMATION | OUTPUT REGISTERED PATIENT INFORMATION |
| 6 | INFORMATION CORRECTION | ACTIVATE INFORMATION CORRECTION PAGE |
| 7 | ALIGNMENT GUIDE START | MOVE TO ALIGNMENT GUIDE SCREEN |
| 8 | DELETE | DELETE CORRESPONDING PATIENT |

FIG. 10

| NO. | ITEM | DEFINITION |
|-----|------|------------|
| 1. | PHOTOGRAPH | OUTPUT REGISTERED PHOTOGRAPH |
| 2. | NAME | OUTPUT REGISTERED NAME |
| 3. | DATE OF BIRTH | OUTPUT REGISTERED DATE OF BIRTH |
| 4. | GENDER | OUTPUT REGISTERED GENDER |
| 5. | PATIENT INFORMATION | OUTPUT REGISTERED PATIENT INFORMATION |
| 6. | FIND IMAGE | ACTIVATE WINDOW EXPLORER, JPG AND PNG ARE SEARCHABLE AND REGISTER CORRESPONDING IMAGE AS PHOTOGRAPH WHEN IMAGE IS SELECTED |
| 7. | REGISTER SCAN | MOVE TO SCAN REGISTRATION SCREEN, GREEN LIGHT IS ACTIVATED WHEN SCAN DATA ARE PRESENT, HOWEVER, CORRESPONDING BUTTON IS NOT OUTPUTTED WHEN INITIAL REGISTRATION IS PERFORMED, BUTTON IS ACTIVATED ONLY WHEN CORRECTION IS PERFORMED |
| 8. | REGISTER CT | DESIGNATE FOLDER THAT IMPORTS CT DATA, GREEN LIGHT IS ACTIVATED WHEN CT DATA ARE PRESENT, HOWEVER, CORRESPONDING BUTTON IS NOT OUTPUTTED WHEN INITIAL REGISTRATION IS PERFORMED, BUTTON IS ACTIVATED ONLY WHEN CORRECTION IS PERFORMED |
| 9. | COMPLETION | STORE ALL INPUTTED CONTENTS |
| 10. | CANCEL | NOT STORE INPUTTED CONTENTS |

FIG. 11
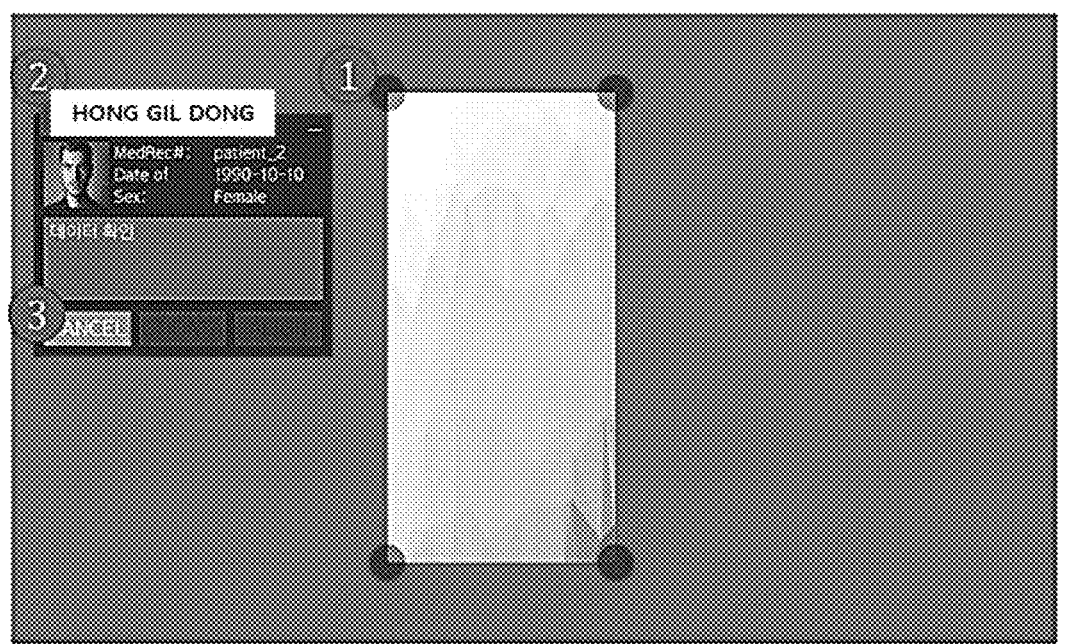
| NO. | ITEM | DEFINITION |
|-----|------|------------|
| 1. | SETTING STATUS | DISPLAY WHETHER FOUR MARKERS ARE MATCHED |
| 2. | PATIENT INFORMATION | DISPLAY COMPREHENSIVE PATIENT INFORMATION |
| 3. | END BUTTON | ENTER LOBBY |
[Table 1]
\<Matched in position\>
\<Not matched in position\>

FIG. 13

| NO. | ITEM | DEFINITION |
|---|---|---|
| 1. | PHOTOGRAPH | OUTPUT SELECTED PATIENT PHOTOGRAPH |
| 2. | NAME | OUTPUT SELECTED PATIENT NAME |
| 3. | DATE OF BIRTH | OUTPUT SELECTED PATIENT DATE OF BIRTH |
| 4. | GENDER | OUTPUT SELECTED PATIENT GENDER |
| 5. | PATIENT INFORMATION | OUTPUT SELECTED PATIENT INPUT INFORMATION |
| 6. | MATCHING INFORMATION | DISPLAY MATCHING INFORMATION BETWEEN PREREGISTERED MODEL AND CURRENT PATIENT AS NUMERICAL VALUE |
| 7. | SCAN SCREEN | OUTPUT PREREGISTERED MODEL AND SCANNED STATE OF PATIENT |
| 8. | CT SCREEN | OUTPUT CT IMAGE |
| 9. | END BUTTON | MOVE TO LOBBY |

FIG. 14

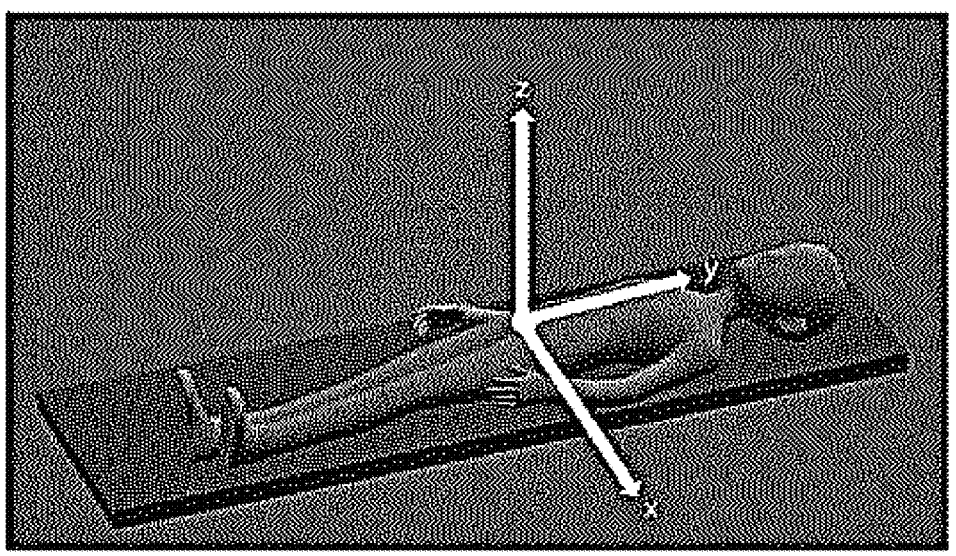

FIG. 15
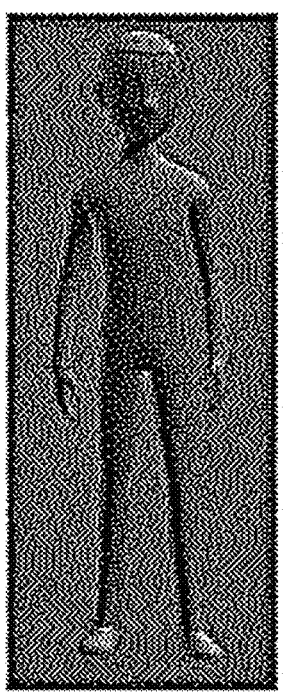
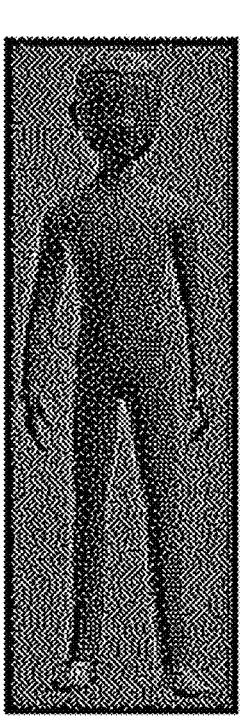
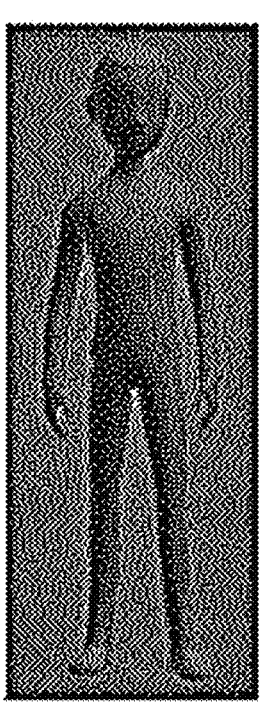
INITIALLY REGISTERED
SURFACE IMAGE
OF CT SIMULATION                    MATCHED                    NOT MATCHED

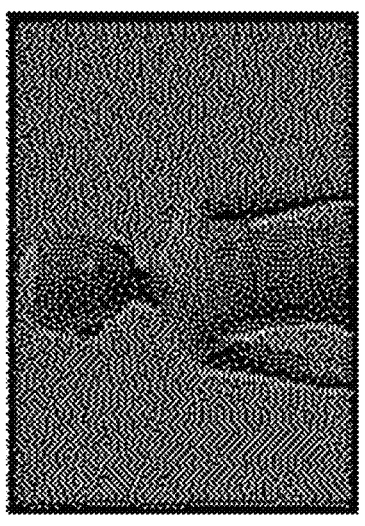
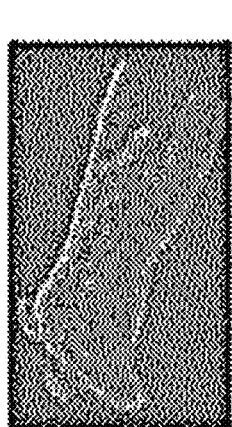
MATCHED WITH INITIALLY REGISTERED
SURFACE IMAGE DURING CT SIMULATION
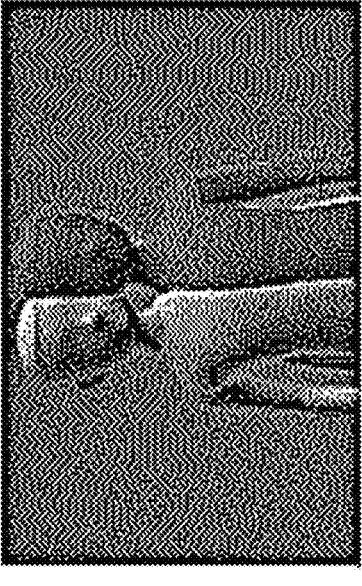
NOT MATCHED WITH INITIALLY
REGISTERED SURFACE IMAGE DURING CT
SIMULATION
FIG. 16

INITIALLY REGISTERED SURFACE IMAGE AND
CURRENT POSITION IMAGE ARE MATCHED

INITIALLY REGISTERED SURFACE IMAGE AND
CURRENT POSITION IMAGE ARE NOT MATCHED

FIG. 18

| NO. | ITEM | DEFINITION |
|-----|------|------------|
| 1. | PHOTOGRAPH | OUTPUT SELECTED PATIENT PHOTOGRAPH |
| 2. | NAME | OUTPUT SELECTED PATIENT NAME |
| 3. | DATE OF BIRTH | OUTPUT SELECTED PATIENT DATE OF BIRTH |
| 4. | GENDER | OUTPUT SELECTED PATIENT GENDER |
| 5. | PATIENT INFORMATION | OUTPUT SELECTED PATIENT INPUT INFORMATION |
| 6. | SCAN SCREEN | DISPLAY SCANNED MODEL |
| 7. | SAVE BUTTON | REGISTER AND STORE CURRENT SCAN MODEL |
| 8. | NEXT BUTTON | GO TO NEXT |
| 9. | END BUTTON | RETURN TO LOBBY |

FIG. 19

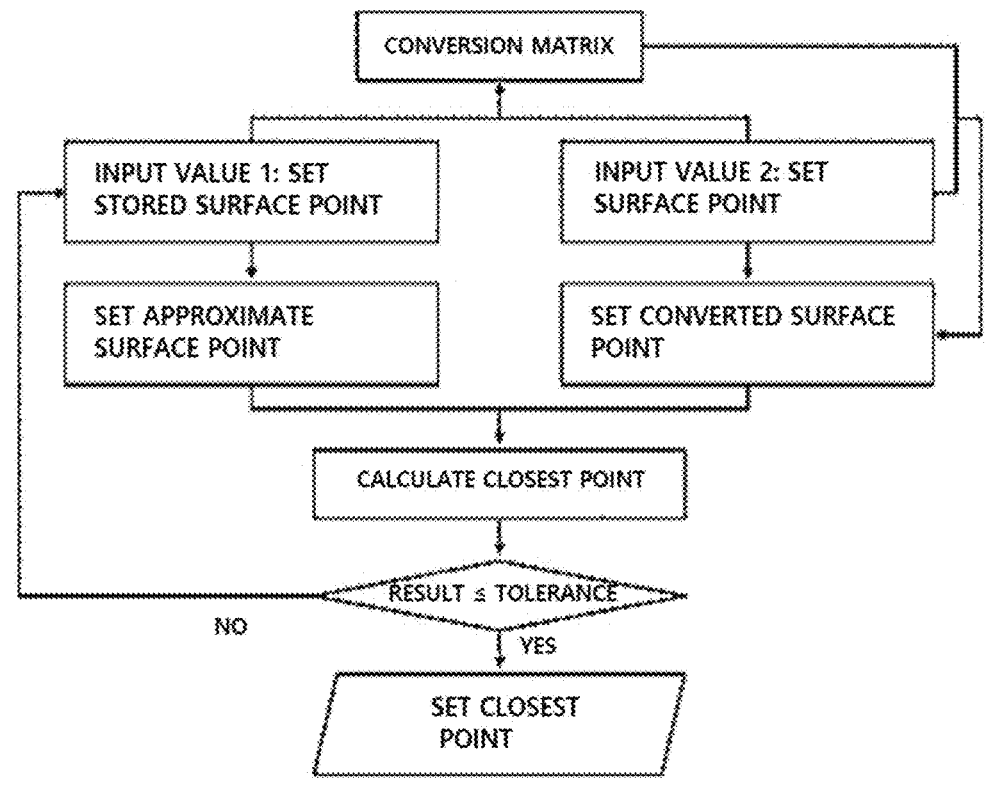

SURFACE IMAGE GUIDANCE-BASED SYSTEM FOR ALIGNING AND MONITORING PATIENT POSITION

CROSS REFERENCE TO RELATED APPLICATIONS

This application is a National Stage of International Application No. PCT/KR2021/017598 filed Nov. 26, 2021, claiming priority based on Korean Patent Application No. 10-2021-0010303 filed Jan. 25, 2021, the entire disclosures of which are incorporated herein by reference.

TECHNICAL FIELD

The present invention relates to a surface image guidance-based system for aligning and monitoring a patient position.

BACKGROUND ART

Practitioners may use various imaging techniques to examine patients. The imaging technique may provide excellent detailed images for some tissue types and/or tissue functions but provide poor images for other tissue types and/or functions. Therefore, various techniques may be used to obtain comprehensive clinical images.

For example, CT imaging techniques may be different from one another in terms of image artifacts, intensity levels, and/or spatial shapes.

The difference may be attributed to a physical process of forming images for respective techniques.

A CT image is acquired by reconstructing an image acquired by a detector by emitting X-rays with a system structure that rotates 360 degrees.

When the patient's treatment is determined on the basis of the diagnosis images, images need to be acquired in a treatment room or an operating room in order to verify a surgical and treatment site for a position of the patient's lesion to be treated according to a surgical scheme in the treatment room and the operating room.

Therefore, an imaging system for identifying the patient's posture is required to verify the position in the treatment room or the operating room.

Various attempts have been made to develop imaging systems for identifying the patient position in the treatment room in order to blend patient information and more properly perform diagnosis, subsequent treatment, and visualization during the treatment process by using imaging techniques for identifying the patient position in the treatment room.

However, the differences between the techniques, such as the differences in image artifacts, intensity, and spatial shapes caused by physical elements related to image information of the technique, makes it difficult to implement the alignment with a standard medical image.

DISCLOSURE

Technical Problem

An object of the present invention is to provide a surface image guidance-based system for aligning and monitoring a patient position.

Technical Solution

Disclosed is a surface image guidance-based system for aligning and monitoring patient position.

To this end, the present invention is characterized by comprising a first RGB depth optical camera positioned toward a table, on which a patient may lie, and configured to capture an image of a right side of the patient's body, a second RGB depth optical camera positioned toward the table, on which the patient may lie, and configured to capture an image of a left side of the patient's body, a central RGB depth optical camera positioned toward the table, on which the patient may lie, and configured to capture an image of a front side of the patient's body, and a central server configured to collect three-dimensional data of the patient on the basis of information captured in conjunction with the three cameras, i.e., the first RGB depth optical camera, the second RGB depth optical camera, and the central RGB depth optical camera and to acquire data points having x, y, and z coordinates in a three-dimensional space and then obtain a reference 3D image of the patient, in which the central server compares the reference 3D image with a 3D image of the patient obtained by image capturing and determines whether the images are the same.

Advantageous Effects

According to the present invention configured as described above, it is possible scan the patient's shape in a 3D manner by using the three optical cameras, i.e., the first RGB depth optical camera, the second RGB depth optical camera, and the central RGB depth optical camera, fix the patient's body on the basis of the scanning result, and assist in aligning the patient's body always at the same position at the time of aligning the patient's body.

In addition, according to the present invention, it is possible to implement various effects of performing more accurate surgical operations and treatment by minimizing human errors caused by medical practitioners who adjust patient positions.

DESCRIPTION OF DRAWINGS

FIG. 2 is a view illustrating a state in which a three-dimensional body surface image of a patient and a CT image of the patient are matched and displayed on a separate display part.

FIG. 5 is a view illustrating a state in which a first RGB depth optical camera, a second RGB depth optical camera, and a central RGB depth optical camera, which are constituent elements of the present invention, are actually installed.

FIGS. 8, 9, and 10 are photographs illustrating a kind of display part screen or application UI by which the present invention may be implemented.

FIG. 11 is a view for explaining a process of setting a table that is a constituent element of the present invention.

FIGS. 12 and 13 are views for explaining an alignment guide and whether matching is made.

FIGS. 14 to 16 are views for explaining a logic adopted to the present invention to compare a stored 3D image and a reference 3D image and determine whether the images are the same within a preset effective range and views illustrating states in which the stored 3D image and the reference 3D image with different colors are displayed on the display part in accordance with whether the stored 3D image and the reference 3D image are matched at the time of comparing the stored 3D image and the reference 3D image.

FIG. 18 is a view illustrating a display screen for explaining a process of registering and storing a scan model.

FIG. 19 is a flowchart for explaining a process of comparing the stored 3D image and the reference 3D image by using an iterative closest algorithm and acquiring a conversion parallel value from differences in distances and directions between points in three axial directions, i.e., x, y, and z directions.

MODES OF THE INVENTION

Hereinafter, an exemplary embodiment of a surface image guidance-based system for aligning and monitoring a patient position of the present invention will be described with reference to the accompanying drawings.

Figure 1:
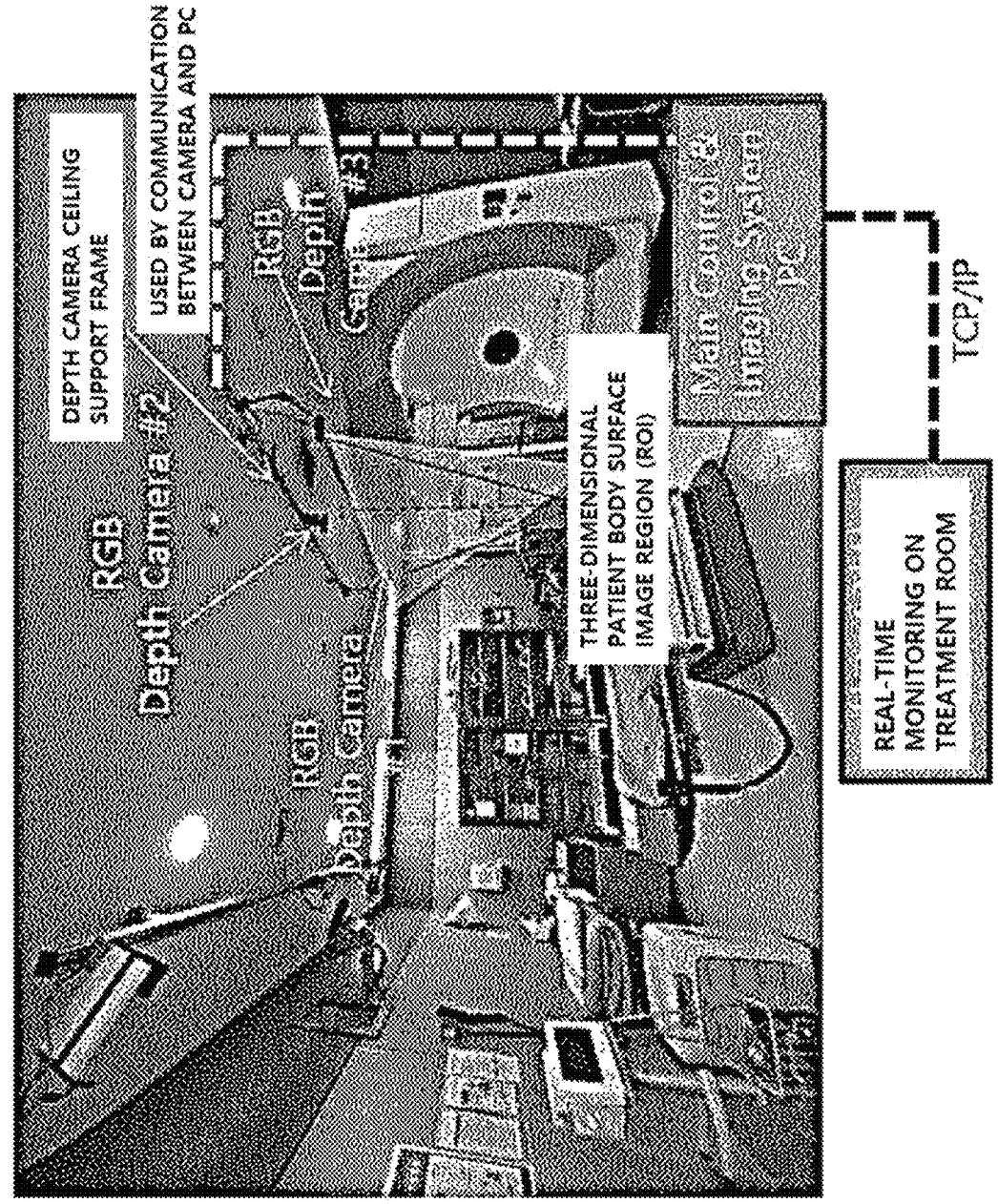
FIG. 1 is an overall configuration view of a surface image guidance-based system for aligning and monitoring a patient position of the present invention.
Figure 3:
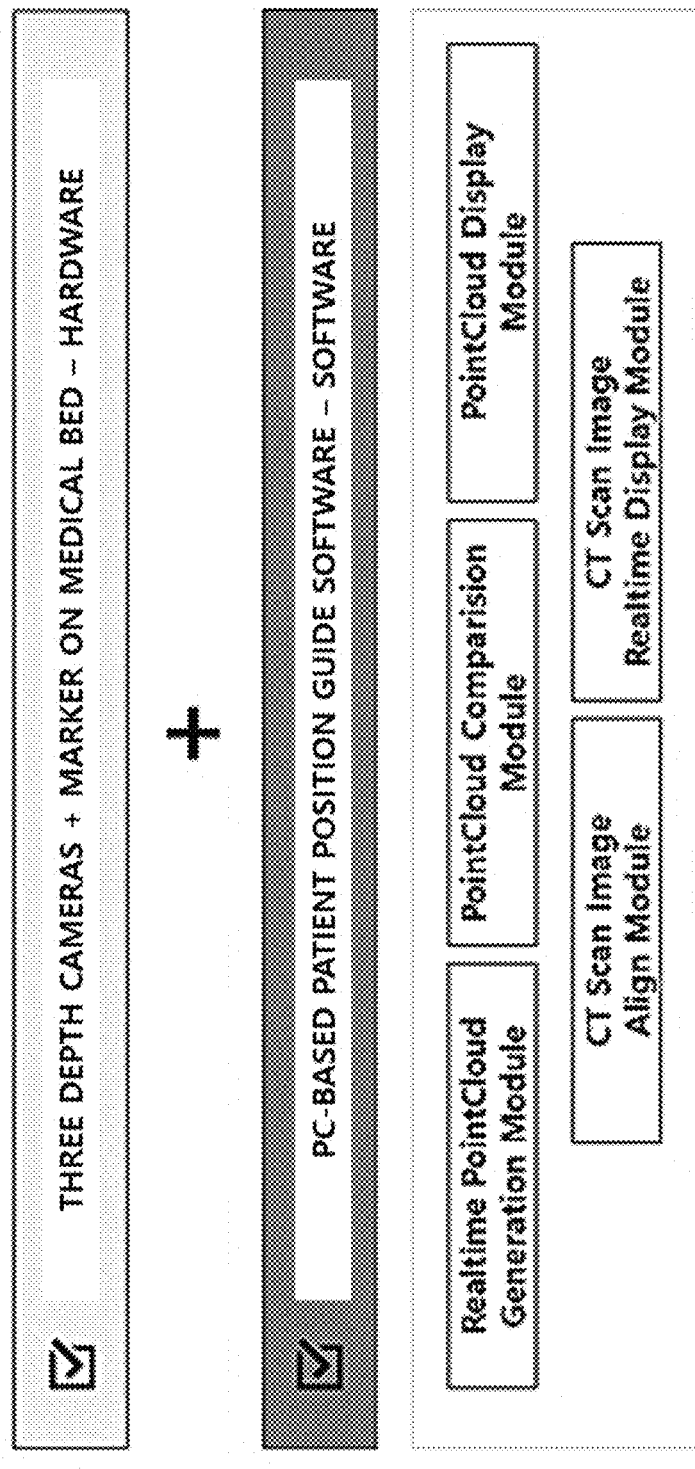
FIG. 3 is a schematic technology schematic view 1 of the present invention.
Figure 4:
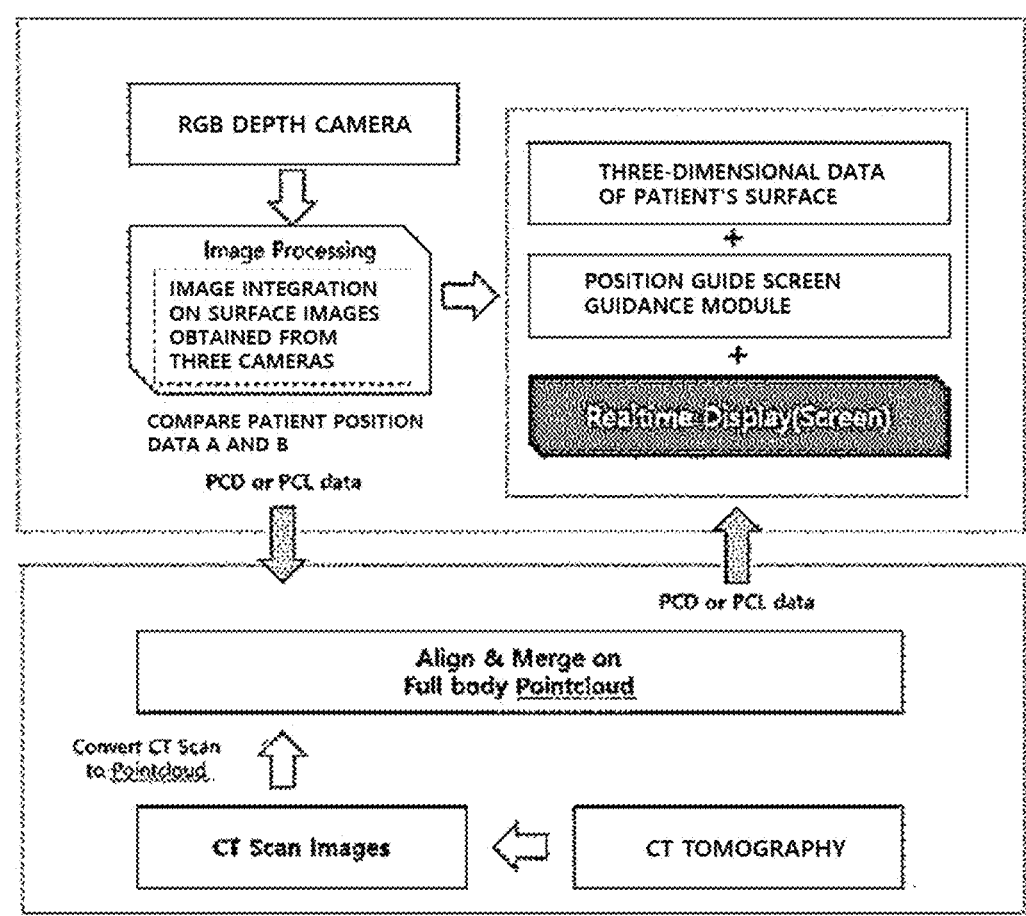
FIG. 4 is a schematic technology schematic view 2 of the present invention.
Figure 6:
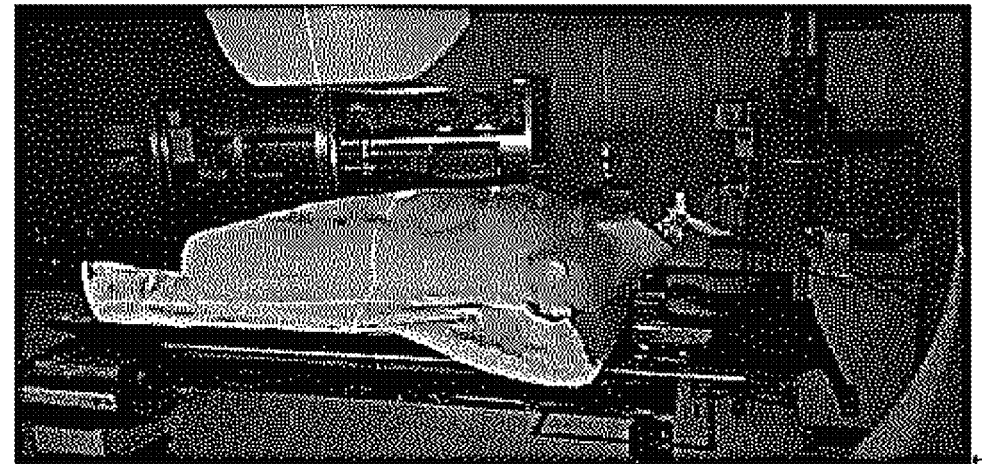
FIG. 6 is a photograph illustrating a state in which a phantom is imaged in an operating room and a treatment room by using the present invention.
Figure 7:
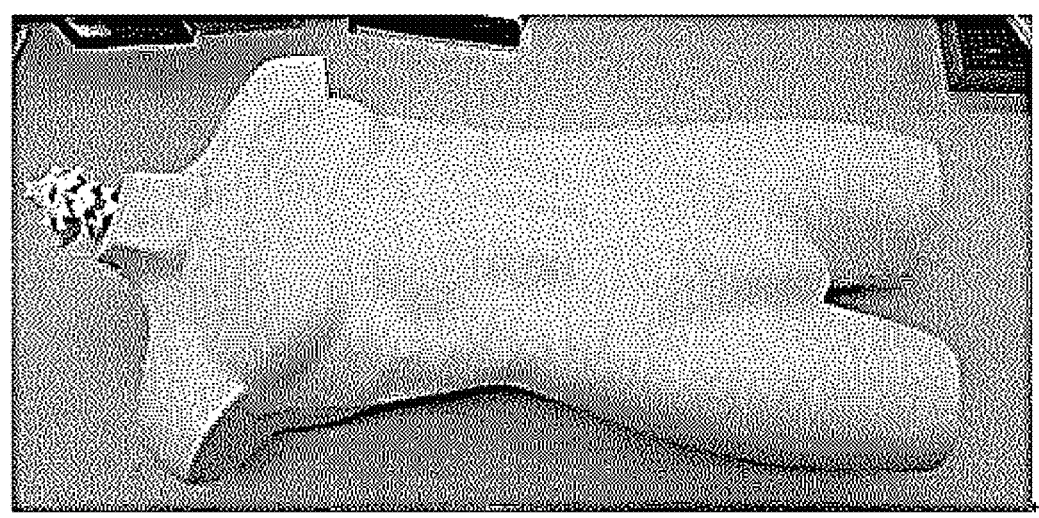
FIG. 7 is a photograph illustrating a phantom developed to use the present invention.
Figure 9:
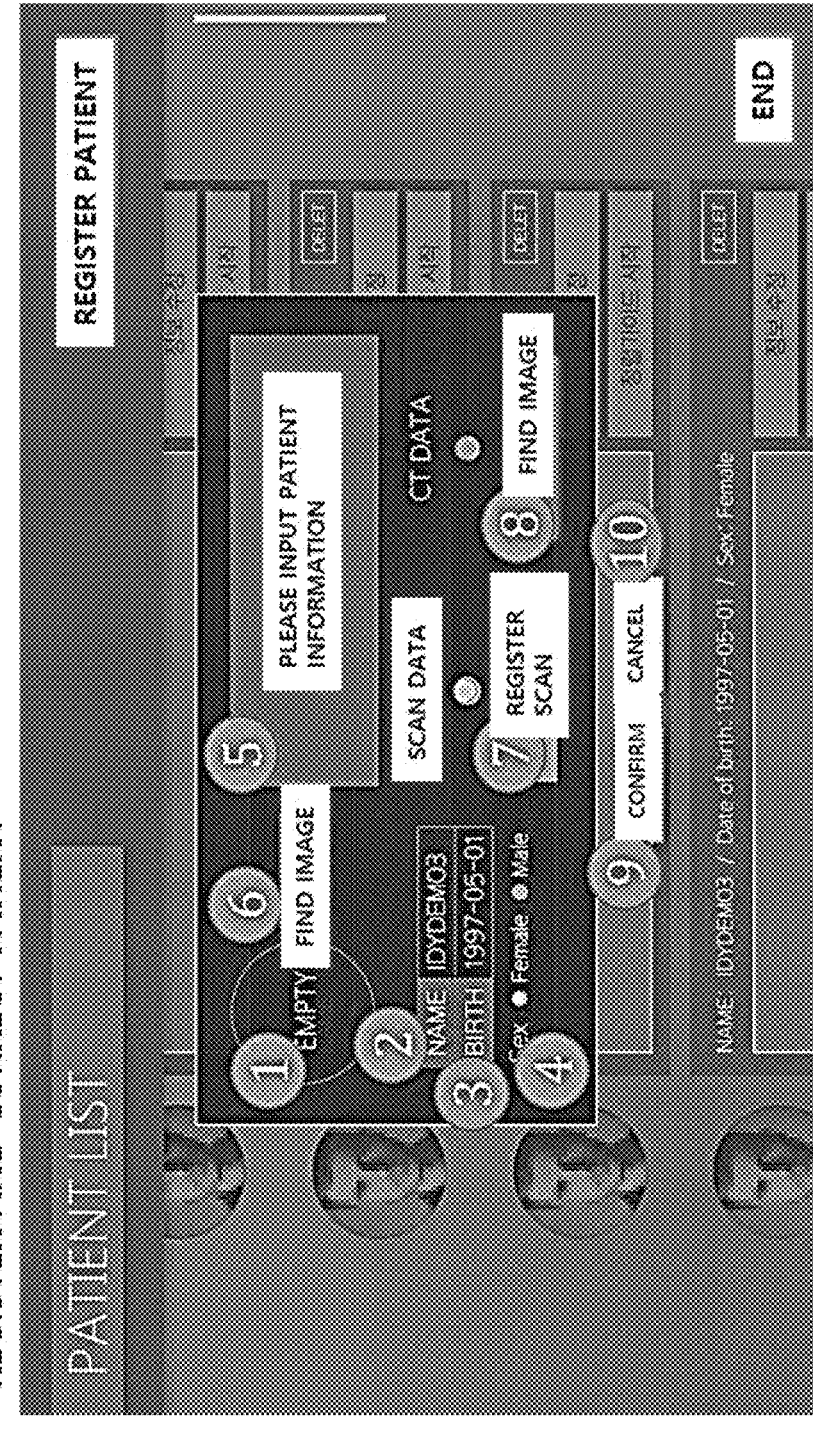
Figure 12:
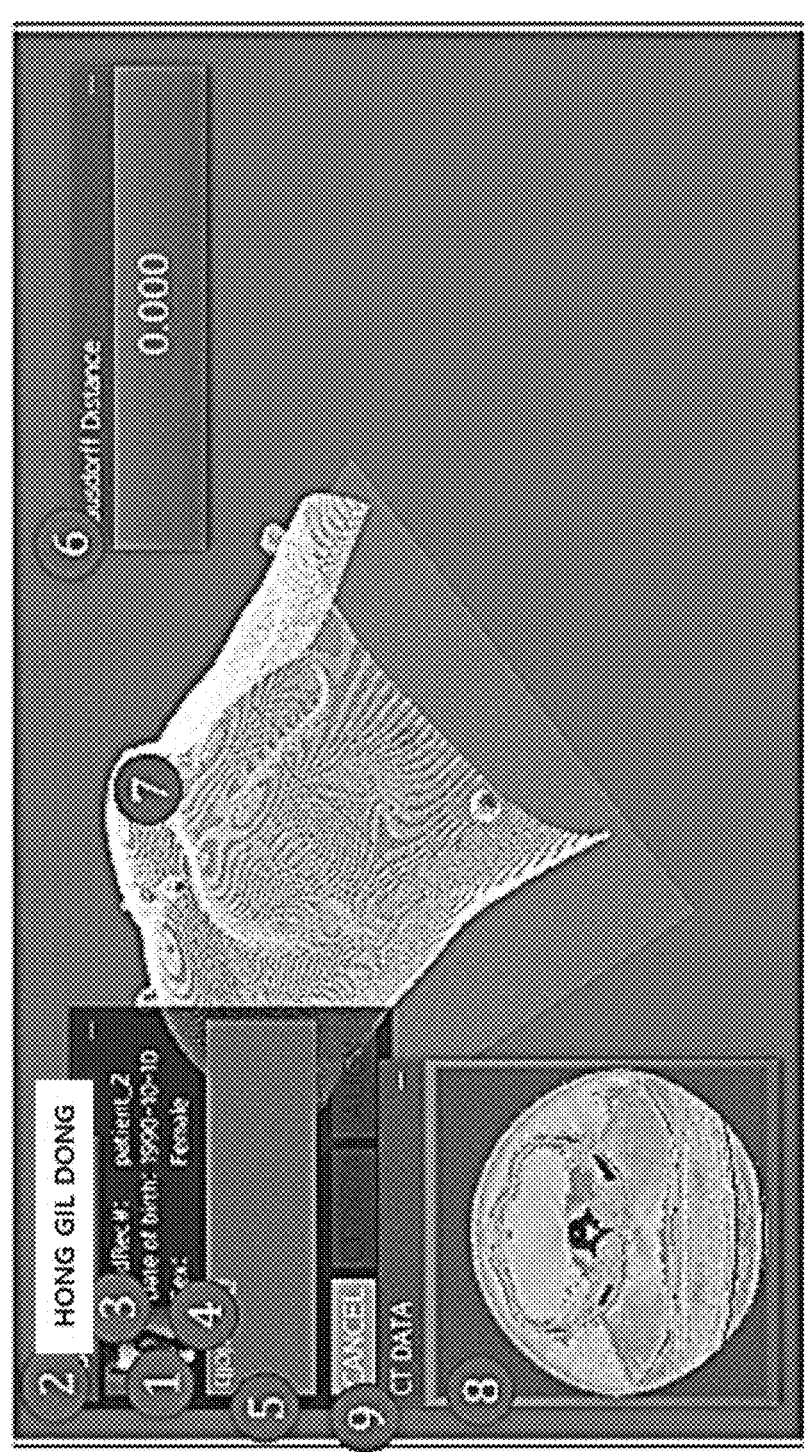
Figure 17:
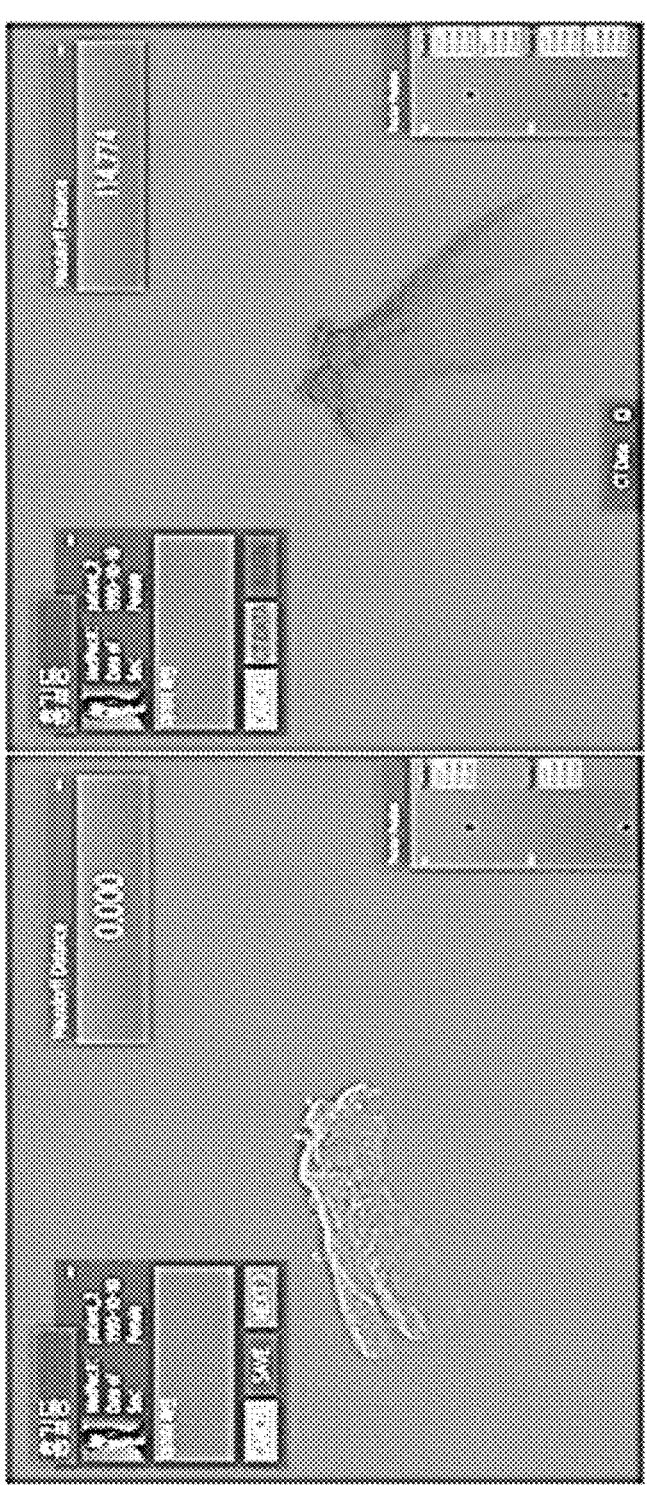
FIG. 17 is a view for explaining a case in which an initially registered surface image and a current position image are matched and a case in which the initially registered surface image and the current position image are not matched.
Figure 20:
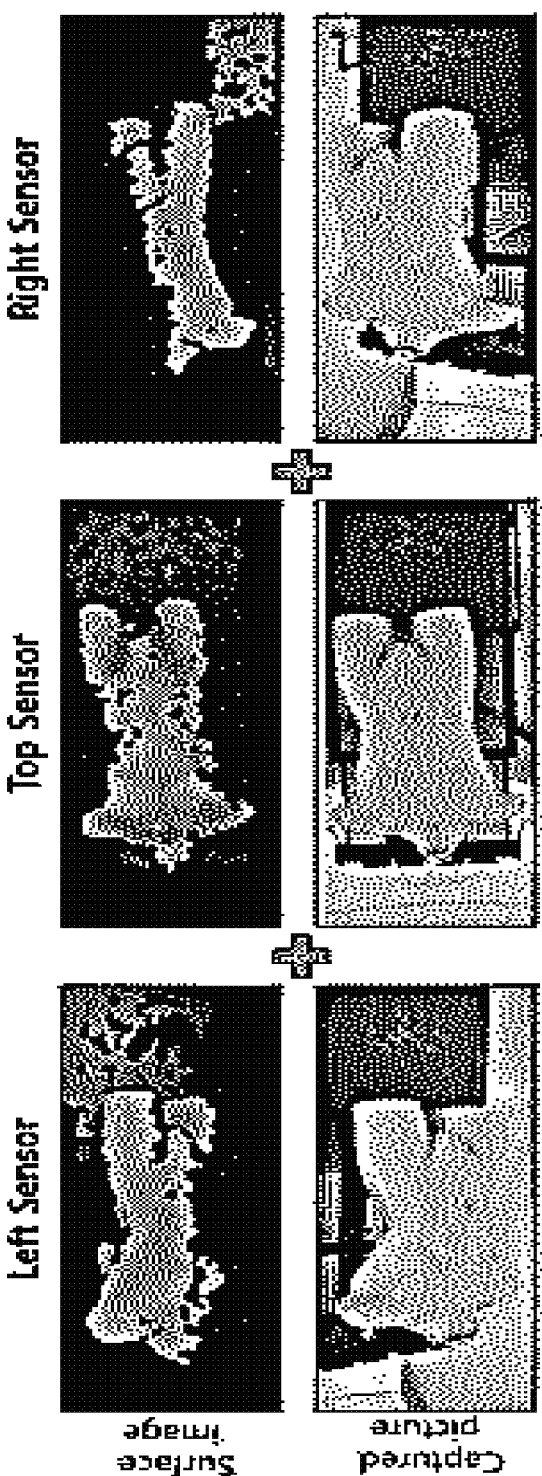
FIG. 20 is a view illustrating an image indicating patient information obtained by using three cameras that are constituent elements of the present invention.
Figure 21:
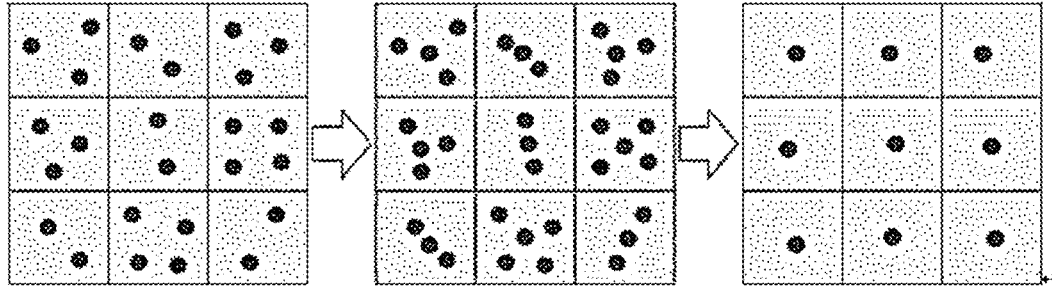
FIG. 21 is a view for explaining downsampling applied to the present invention.

FIG. 1 is an overall configuration view of a surface image guidance-based system for aligning and monitoring a patient position of the present invention, FIG. 2 is a view illustrating a state in which a three-dimensional body surface image of a patient and a CT image of the patient are matched and displayed on a separate display part, FIG. 3 is a schematic technology schematic view 1 of the present invention, FIG. 4 is a schematic technology schematic view 2 of the present invention, FIG. 5 is a view illustrating a state in which a first RGB depth optical camera, a second RGB depth optical camera, and a central RGB depth optical camera, which are constituent elements of the present invention, are actually installed, FIG. 6 is a photograph illustrating a state in which a phantom is imaged in an operating room and a treatment room by using the present invention, FIG. 7 is a photograph illustrating a phantom developed to use the present invention, FIGS. 8, 9, and 10 are photographs illustrating a kind of display part screen or application UI by which the present invention may be implemented, FIG. 11 is a view for explaining a process of setting a table that is a constituent element of the present invention, FIGS. 12 and 13 are views for explaining an alignment guide and whether matching is made, and FIGS. 14 to 16 are views for explaining a logic adopted to the present invention to compare a stored 3D image and a reference 3D image and determine whether the images are the same within a preset effective range and views illustrating states in which the stored 3D image and the reference 3D image with different colors are displayed on the display part in accordance with whether the stored 3D image and the reference 3D image are matched at the time of comparing the stored 3D image and the reference 3D image. FIGS. 17 and 18 are accompanying drawings for explaining scan registration. FIG. 19 is a flowchart for explaining a process of comparing the stored 3D image and the reference 3D image by using an iterative closest algorithm and acquiring a conversion parallel value from differences in distances and directions between points in three axial directions, i.e., x, y, and z directions. FIG. 20 is a view illustrating an image indicating patient information obtained by using three cameras that are constituent elements of the present invention. FIG. 21 is a view for explaining downsampling applied to the present invention.

Hereinafter, the present invention will be specifically described with reference to FIGS. 1 to 21.

FIGS. 1 to 2 are overall configuration views of the present invention. As illustrated, the present invention is characterized by comprising a first RGB depth optical camera positioned toward a table, on which a patient may lie, and configured to capture an image of a right side of the patient's body, a second RGB depth optical camera positioned toward the table, on which the patient may lie, and configured to capture an image of a left side of the patient's body, a central RGB depth optical camera positioned toward the table, on which the patient may lie, and configured to capture an image of a front side of the patient's body, and a central server configured to collect three-dimensional data of the patient on the basis of information captured in conjunction with the first RGB depth optical camera, the second RGB depth optical camera, and the central RGB depth optical camera and to acquire data points having x, y, and z coordinates in a three-dimensional space and then obtain a reference 3D image of the patient, in which the central server compares the reference 3D image with a 3D image of the patient obtained by image capturing and determines whether the images are the same.

FIG. 3 is a schematic technology schematic view 1 of the present invention, and FIG. 4 is a schematic technology schematic view 2 of the present invention.

With the above-mentioned configuration, the present invention scans the patient's shape in a 3D manner by using the three optical cameras, i.e., the first RGB depth optical camera, the second RGB depth optical camera, and the central RGB depth optical camera, fixes the patient's body on the basis of the scanning result, and assists in aligning the patient's body always at the same position at the time of aligning the patient's body.

Furthermore, in addition to a method of using seven optical markers in the related art, a technology is provided, which may perform visual identification through a display part by using the three optical cameras, i.e., the first RGB depth optical camera, the second RGB depth optical camera, and the central RGB depth optical camera and operate in conjunction with a CT Image (DICOM Data).

First, a 3D scanning process is performed by using the three optical cameras, i.e., the first RGB depth optical camera, the second RGB depth optical camera, and the central RGB depth optical camera.

In a step of modeling a patient position and an object in a 3D manner to configure data for modeling, the 3D object is modeled and outputted to the display part, and the 3D object is updated for each frame.

Next, a step of determining whether the storage and matching are performed is performed.

The patient information is acquired by storing a configuration and a position of a reference 3D image that is a criterion of the patient.

Thereafter, when the patient is exposed again to the three optical cameras, i.e., the first RGB depth optical camera, the second RGB depth optical camera, and the central RGB depth optical camera, a process of recognizing the configurations and positions of the finally updated 3D image of the user and the reference 3D image and identifying a difference from information from the stored reference 3D image is performed in real time (a step of comparing the reference 3D image with a 3D image of the patient obtained by image capturing and determining whether the images are the same).

To this end, at the time of comparing the reference 3D image with the 3D image of the patient obtained by image capturing, the reference 3D image and the 3D image of the patient are digitized and compared and displayed in real time (using a Hausdorff distance).

Next, CT data are outputted.

The CT image is aligned on the surface data (point cloud) of the patient, which is created in real time, and real-time 3D data are outputted onto the screen so that the user may view a CT photograph at a desired position at any time during alignment guidance.

Meanwhile, the central server is characterized by acquiring data points having x, y, and z coordinates in the three-dimensional space and then obtaining a 3D image of the patient's body by performing an image processing process.

Furthermore, the present invention may further include the separate display part that may be identified by the user. The display part matches the 3D image of the patient's body and the CT image of the patient and displays the 3D image of the patient's body and the CT image of the patient to the user.

As described above, the first RGB depth optical camera, the second RGB depth optical camera, the central RGB depth optical camera, and the central server are characterized by obtaining the reference 3D image by designating the patient position that is a modeling object.

In this case, the first RGB depth optical camera, the second RGB depth optical camera, and the central RGB depth optical camera sense the patient's depth, surface, and position and create the 3D image, and the 3D image is updated in real time by being tracked in accordance with the patient's motion. The central server stores a finally updated 3D image, compares the stored 3D image with the reference 3D image, and determines whether the images are the same within a preset effective range (within ±1 mm).

The steps according to the above-mentioned configuration will be described more specifically.

A so-called initialization step is performed.

The patient is placed on the table.

The 3D Model is created by receiving the patient's depth, surface, and position by using the first RGB depth optical camera, the second RGB depth optical camera, and the central RGB depth optical camera, and the 3D Model is stored in the patient information (a step of creating the stored 3D image).

Next, a so-called alignment guide step is performed.

The patient is placed on the table.

The 3D Model is created by receiving the patient's depth, surface, and position by using the first RGB depth optical camera, the second RGB depth optical camera, and the central RGB depth optical camera, and the 3D model is created through the image processing process.

The image processing process is a process of mixing and integrating left and right images into a single image from surface images respectively obtained from the first RGB depth optical camera, the second RGB depth optical camera, and the central RGB depth optical camera and a central image obtained from the central RGB depth optical camera.

During the process of making the integrated image, when the central image and the left or right image are identical in positions of corresponding coordinates based on particular three-dimensional coordinates of x, y, and z, the positions of the central image and the left or right image are considered the same point. In respect to the other coordinates different in positions, x', y', and z' coordinates of a new integrated image are created by rotation (R) and movement (T) matrix conversion with respect to the other coordinates different in positions based on an image coordinate obtained from the central RGB depth optical camera. The 3D Model, which is created as described above, is stored in the patient information (a step of creating the stored 3D image).

Next, the so-called alignment guide step is performed.

The patient is placed on the table.

The 3D Model is created by receiving the patient's depth, surface, and position by using the first RGB depth optical camera, the second RGB depth optical camera, and the central RGB depth optical camera, and the 3D Model is updated by being tracked in accordance with the patient's motion (a step of creating and storing finally updated 3D image).

Next, the stored 3D image and the finally updated 3D image are compared, and whether the images may be considered as the same image within a preset effective range is checked, such that the process is adjusted and completed.

Meanwhile, FIG. 5 is a view illustrating a state in which the first RGB depth optical camera, the second RGB depth optical camera, and the central RGB depth optical camera, which are constituent elements of the present invention, are actually installed, FIG. 6 is a photograph illustrating a state in which a phantom is imaged in an operating room and a treatment room by using the present invention, and FIG. 7 is a photograph illustrating a phantom developed to use the present invention.

As illustrated in FIG. 5, a point cloud converts TL and TR matrices made by the left and right cameras (the first RGB depth optical camera and the second RGB depth optical camera) to the top camera (the central RGB depth optical camera), and the three cameras (the first RGB depth optical camera, the second RGB depth optical camera, and the central RGB depth optical camera) are incorporated into a single value.

As a result, the core of the alignment guide is to provide an integrated user interface that displays an image processing algorithm and an image related to a rotation and movement for forming the image acquired from the three cameras and displays the patient information by means of the detection of the 3D model of the patient by the first RGB depth optical camera, the second RGB depth optical camera, and the central RGB depth optical camera.

The central server, which is the constituent element of the present invention, is characterized by acquiring the data points having the x, y, and z coordinates in the three-dimensional space and then obtaining the 3D image of the patient's body by performing the image processing process. The image processing process is characterized by integrating surface images, which are respectively captured by the first RGB depth optical camera, the second RGB depth optical camera, and the central RGB depth optical camera, into a single image.

In this case, a downsampling logic for reducing the image is performed to prevent a decrease in speed of the processing process. The matrix for performing the downsampling logic is performed in accordance with an equation below.

When the positions of the corresponding coordinates are identical to one another, based on the x, y, and z coordinates in the three-dimensional space, in respect to the surface image captured by the central RGB depth optical camera and the right surface image or the left surface image captured by the first RGB depth optical camera and the second RGB depth optical camera, the positions of the corresponding coordinates are considered as the same position. In respect to the other coordinates different in positions, x', y', and z' coordinates of the integrated image are created by rotation (R) and movement (T) matrix conversion with respect to the other coordinates different in positions based on the surface image coordinate obtained from the central RGB depth optical camera.

$$\begin{pmatrix} x' \\ y' \\ z' \\ 1 \end{pmatrix} = \begin{pmatrix} R_{xx} & R_{xy} & R_{xz} & T_x \\ R_{yx} & R_{yy} & R_{yz} & T_y \\ R_{zx} & R_{zy} & R_{zz} & T_z \\ 0 & 0 & 0 & 1 \end{pmatrix} \begin{pmatrix} x \\ y \\ z \\ 1 \end{pmatrix}$$

Meanwhile, FIGS. 8, 9, and 10 are photographs display part screens or application UIs that may be implemented by the present invention, and FIG. 11 is a view for explaining a process of setting the table that is the constituent element of the present invention.

However, in FIG. 11, a case in which the markers and designated positions are clearly matched and a case in which the markers and the designated positions are not clearly matched are displayed as shown in Table 1 of FIG. 11.

Meanwhile, FIGS. 12 and 13 are views for explaining the alignment guide and whether matching is made, and FIGS. 14 to 16 are views for explaining a logic adopted to the present invention to compare the stored 3D image and the reference 3D image and determine whether the images are the same within a preset effective range and views illustrating states in which the stored 3D image and the reference 3D image with different colors are displayed on the display part in accordance with whether the stored 3D image and the reference 3D image are matched at the time of comparing the stored 3D image and the reference 3D image.

FIG. 17 is a view for explaining a case in which an initially registered surface image and a current position image are matched and a case in which the initially registered surface image and the current position image are not matched. FIG. 18 is a view illustrating a display screen for explaining a process of registering and storing a scan model.

FIG. 19 is a flowchart for explaining a process of comparing the stored 3D image and the reference 3D image by using an iterative closest algorithm and acquiring a conversion parallel value from differences in distances and directions between points in three axial directions, i.e., x, y, and z directions.

FIG. 20 is a view illustrating an image indicating patient information obtained by using the three cameras that are the constituent elements of the present invention.

FIG. 21 is a view for explaining downsampling applied to the present invention.

The process of storing the finally updated 3D image, comparing the stored 3D image and the reference 3D image, and determining whether the images are the same within a preset effective range is implemented by the following equations.

A Hausdorff distance equation and an iterative closest algorithm are implemented to allow the central server to store the finally updated 3D image, compare the stored 3D image and the reference 3D image, and determine whether the images are the same within the preset effective range.

In this case, the iterative closest algorithm compares the reference 3D image with the 3D image stored in the order illustrated in FIG. 19 and acquires a conversion parallel value from the differences in distances and directions between the points in the directions of three axes, i.e., the x, y, and z axes.

In the preset effective range, the repositioning error needs to be included in an effective range (±1 mm) based on the stored 3D image, in which the image is stored, in accordance with AAPM TG40.

In this case, it is determined that the two objects are matched with and adjacent to each other as the difference in distance between the two points becomes closer to zero. This distance is defined as the shortest distance.

Further, the difference in distance between points in a space is expressed as a single average distance in respect to the x, y, and z coordinates.

$$H(A, B) = \max(h(A, B), h(B, A))$$

$$h(A, B) = \max_{z \in A}\left(\min_{y \in B}\|x - y\|\right)$$

$$h(A, B) = \max_{z \in A}\left(\min_{y \in B}\|x - y\|\right)$$

(The Hausdorff distance is defined. The Hausdorff distance is a maximum deviation between two models. Two sets of points (point A and point B) in the space are points adjacent to each other in a minimum distance, and how far apart initial point A and moved point A are from each other is measured by maximizing the distance between initial point A and moved point A. When two cloud point sets A and B, which are not empty, are designated, the Hausdorff distance between A and B is defined as H (A, B)).

In this case, the finally updated 3D image is stored, and the stored 3D image and the reference 3D image are compared. A case in which the images are within the preset effective range and a case in which the images are not within the preset effective range are displayed with separate colors on the display part. This is illustrated in FIGS. 15 to 16.

FIGS. 17 and 18 are accompanying drawings for explaining scan registration, and a specific description is replaced with the drawings.

The invention claimed is:

1. A surface image guidance-based system for aligning and monitoring a patient position, the surface image guidance-based system comprising:

a first RGB depth optical camera positioned toward a table, on which a patient may lie, and configured to capture an image of a right side of the patient's body;

a second RGB depth optical camera positioned toward the table, on which the patient may lie, and configured to capture an image of a left side of the patient's body;

a central RGB depth optical camera positioned toward the table, on which the patient may lie, and configured to capture an image of a front side of the patient's body; and a central server configured (i) to collect three-dimensional data of the patient on the basis of information captured in conjunction with the first RGB depth optical camera, the second RGB depth optical camera, and the central RGB depth optical camera, and (ii) to acquire data points having x, y, and z coordinates in a three-dimensional space and then obtain a reference 3D image of the patient, wherein the central server compares the reference 3D image with a 3D image of the patient obtained by image capturing and determines whether the images are the same, wherein the central server acquires the data points having the x, y, and z coordinates in the three-dimensional space and then obtains a 3D image of the patient's body by performing an image processing process, wherein the image processing process integrates surface images, which are respectively captured by the first RGB depth optical camera, the second RGB depth optical camera, and the central RGB depth optical camera, into a single image, wherein a downsampling logic for reducing the image is performed to prevent a decrease in speed of the processing process, and a matrix for performing the downsampling logic is performed in accordance with an equation below, wherein when positions of the corresponding coordinates are identical to one another, based on the x, y, and z coordinates in the three-dimensional space, in respect to a surface image captured by the central RGB depth optical camera and a right surface image or a left surface image captured by the first RGB depth optical camera and the second RGB depth optical camera, the positions of the corresponding coordinates are considered as the same position, and wherein in respect to the other coordinates different in positions, x', y', and z' coordinates of the integrated image are created by rotation (R) and movement (T) matrix conversion with respect to the other coordinates different in positions based on a surface image coordinate obtained from the central RGB depth optical camera, $$\begin{pmatrix} x' \\ y' \\ z' \\ 1 \end{pmatrix} = \begin{pmatrix} R_{xx} & R_{xy} & R_{xz} & T_x \\ R_{yx} & R_{yy} & R_{yz} & T_y \\ R_{zx} & R_{zy} & R_{zz} & T_z \\ 0 & 0 & 0 & 1 \end{pmatrix} \begin{pmatrix} x \\ y \\ z \\ 1 \end{pmatrix}.$$

2. The surface image guidance-based system of claim 1, further comprising:

a separate display part capable of being identified by a user, wherein the display part matches the 3D image of the patient's body and the CT image of the patient and displays the 3D image of the patient's body and the CT image of the patient to the user.

3. The surface image guidance-based system of claim 2, wherein the first RGB depth optical camera, the second RGB depth optical camera, the central RGB depth optical camera, and the central server obtain the reference 3D image by designating a patient position that is an imaging object.

4. The surface image guidance-based system of claim 3, wherein the first RGB depth optical camera, the second RGB depth optical camera, and the central RGB depth optical camera sense the patient's depth, surface, and position and create the 3D image, the 3D image is updated in real time by being tracked in accordance with the patient's motion, and the central server stores a finally updated 3D image, compares the stored 3D image with the reference 3D image, and determines whether the images are the same within a preset effective range.

5. The surface image guidance-based system of claim 4, wherein the central server uses a Hausdorff distance equation and an iterative closest algorithm to store the finally updated 3D image, compare the stored 3D image and the reference 3D image, and determine whether the images are the same within the preset effective range, $$H(A, B) = \max(h(A, B), h(B, A))$$

$$h(A, B) = \max_{z \in A}\left(\min_{y \in B}\|x - y\|\right)$$

$$h(A, B) = \max_{z \in A}\left(\min_{y \in B}\|x - y\|\right),$$

wherein a Hausdorff distance is defined, the Hausdorff distance is a maximum deviation between two models, how far apart two point sets are from each other is measured, two cloud point sets A and B, which are not empty, are designated, and the Hausdorff distance between A and B is defined as H (A, B).

6. The surface image guidance-based system of claim 5, wherein the central server stores the finally updated 3D image, compares the stored 3D image and the reference 3D image, and displays, with separate colors on the display part, a case in which the images are within the preset effective range and a case in which the images are not within the preset effective range.

* * * * *